(12) United States Patent
Dao

(10) Patent No.: US 9,007,023 B2
(45) Date of Patent: *Apr. 14, 2015

(54) PORTABLE POWER SUPPLY

(75) Inventor: Yuan Dao, Phoenix, AZ (US)

(73) Assignee: Elite Power Solutions LLC, Tempe, AZ (US)

( * ) Notice: Subject to any disclaimer, the term of this patent is extended or adjusted under 35 U.S.C. 154(b) by 529 days.

This patent is subject to a terminal disclaimer.

(21) Appl. No.: 13/420,169

(22) Filed: Mar. 14, 2012

(65) Prior Publication Data

US 2013/0241488 A1 Sep. 19, 2013

(51) Int. Cl.
*H02J 7/00* (2006.01)
(52) U.S. Cl.
CPC .............. *H02J 7/0022* (2013.01); *H02J 7/0026* (2013.01); *H02J 7/0068* (2013.01); *H02J 2007/0037* (2013.01); *H02J 2007/004* (2013.01)
(58) Field of Classification Search
CPC ...................................................... H02J 7/0042
USPC .......................................................... 320/111
See application file for complete search history.

(56) References Cited

U.S. PATENT DOCUMENTS

| | | | |
|---|---|---|---|
| 4,300,087 A | 11/1981 | Meisner | |
| 7,388,348 B2 * | 6/2008 | Mattichak | 320/101 |
| 7,508,163 B2 | 3/2009 | Batts-Gowins | |
| 7,511,451 B2 | 3/2009 | Pierce | |
| 8,080,972 B2 | 12/2011 | Smith | |
| 2005/0146222 A1 * | 7/2005 | Hulden | 307/66 |
| 2007/0257642 A1 * | 11/2007 | Xiao et al. | 320/134 |
| 2008/0265678 A1 * | 10/2008 | Brotto et al. | 307/46 |
| 2009/0251149 A1 * | 10/2009 | Buckner et al. | 324/426 |
| 2009/0296442 A1 * | 12/2009 | Chang et al. | 363/142 |
| 2010/0038974 A1 * | 2/2010 | Imperial | 307/150 |
| 2010/0244769 A1 * | 9/2010 | Sakakibara | 320/118 |
| 2011/0049979 A1 | 3/2011 | Yen | |
| 2011/0074355 A1 | 3/2011 | Dao et al. | |
| 2011/0114608 A1 | 5/2011 | Albrecht | |
| 2011/0286168 A1 * | 11/2011 | Scheucher | 361/679.01 |

* cited by examiner

*Primary Examiner* — Edward Tso
*Assistant Examiner* — Jerry D Robbins
(74) *Attorney, Agent, or Firm* — Invention To Patent Services; Alex Hobson

(57) ABSTRACT

In one aspect, the present disclosure describes an apparatus that may include a battery unit including one or more lithium-ion battery cells, and a charging unit configured with a first automatic shut-off, where the automatic shut-off is responsive to detection of an upper threshold voltage level of the battery unit. The apparatus may include an inverter configured with a second automatic shut-off, where the second automatic shut-off is responsive to detection of a lower threshold voltage level of the battery unit, and an input connection functionally connected to the charging unit. The apparatus may be configured to isolate the battery unit from the inverter responsive to detecting both (a) the input connection is disconnected from an input voltage source, and (b) the inverter is shut off.

20 Claims, 3 Drawing Sheets

PORTABLE POWER SUPPLY

BACKGROUND

A back up power supply may be used to provide power when a wired electricity supply is unavailable. For example, during power outages or while away from a building (e.g., while camping or hunting, when providing an outdoor presentation, etc.), a back up power supply may be used to power one or more devices or pieces of equipment. In another example, a portable power supply may be used to jump start a vehicle. The source of power for the back up power supply, in some examples, may include propane, gas, and/or battery.

SUMMARY

In one aspect, the present disclosure describes an apparatus that may include a battery unit including one or more lithium-ion battery cells, and a charging unit configured with a first automatic shut-off, where the automatic shut-off is responsive to detection of an upper threshold voltage level of the battery unit. The apparatus may include an inverter configured with a second automatic shut-off, where the second automatic shut-off is responsive to detection of a lower threshold voltage level of the battery unit, and an input connection functionally connected to the charging unit. The apparatus may be configured to isolate the battery unit from the inverter responsive to detecting both (a) the input connection is disconnected from an input voltage source, and (b) the inverter is shut off.

The apparatus may include a first switching unit connected between the battery unit and a main switching unit. Detecting the inverter is shut off may include failing to detect a threshold output voltage of the inverter at an output connection. The first switching unit may be configured to move to a closed position responsive to detecting the threshold output voltage. The threshold output voltage may be substantially equivalent to 110 Volts.

The apparatus may include a second switching unit connected between the battery unit and the main switching unit. Detecting the input connection is disconnected from an input voltage source may include failing to detect a threshold input voltage at the input connection. The second switching unit may be configured to move to a second closed position upon detecting the threshold input voltage at the input connection. The threshold input voltage is substantially equivalent to 110 Volts.

The apparatus may include a three-way switch including a charging position, a discharging position, and an off position. The apparatus may be configured to isolate the battery unit from the inverter when the three-way switch is in the off position.

The apparatus may include two or more light emitting diodes presented in series. A relative number of activated light emitting diodes of the two or more light emitting diodes may correlate to an approximate percentage of charge of the battery unit.

A capacity of the battery unit may be at least 400 Watt hours. The battery unit may include at least four lithium-ion battery cells. The battery unit may include a potential of approximately twelve Volts.

The input connection may include an A/C plug interface for providing a wired connection to a household electrical output socket. The apparatus may include at least one A/C output socket connection functionally connected to the inverter. The apparatus may include at least one USB output connection functionally connected to the inverter.

The apparatus may include a balancing system connected to the battery unit, where the balancing system includes a discharging circuit configured to, responsive to detecting a battery cell voltage of a predetermined voltage threshold, draw a constant discharging current from at least a first battery cell of the one or more lithium-ion battery cells. The balancing system may draw the constant discharging current until detecting the battery cell voltage is below the predetermined voltage threshold.

In one aspect, the present disclosure describes a system including a rechargeable battery unit including one or more lithium-ion battery cells, a charging unit, an inverter functionally connected to an output connection, and an input connection functionally connected to the charging unit. The input connection may be configured for connection to a recharging power source. The system may include a main switching unit and a first switching unit connected between the battery unit and the main switching unit. The first switching unit may be configured to activate the main switching unit responsive to detecting a threshold output voltage of the inverter at an output connection. The system may include second switching unit connected between the battery unit and the main switching unit. The second switching unit may be configured to activate the main switching unit responsive to detecting a threshold input voltage at the input connection. The first switching unit and the second switching unit may be configured to prevent over-discharging the rechargeable battery unit by isolating the battery unit from a parasitic load of the inverter.

The output connection may be configured for connection to at least one of a universal serial bus port and an A/C socket outlet. At least one of the first switching unit and the second switching unit may include a solenoid. The charging unit may be configured with an automatic shut-off, where the automatic shut-off is responsive to detection of an upper threshold voltage level of the battery unit. The inverter may be configured with an automatic shut-off, where the automatic shut-off is responsive to detection of a lower threshold voltage level of the battery unit.

BRIEF DESCRIPTION OF THE FIGURES

The foregoing and other objects, aspects, features, and advantages of the present disclosure will become more apparent and better understood by referring to the following description taken in conjunction with the accompanying drawings, in which.

Figure 1:
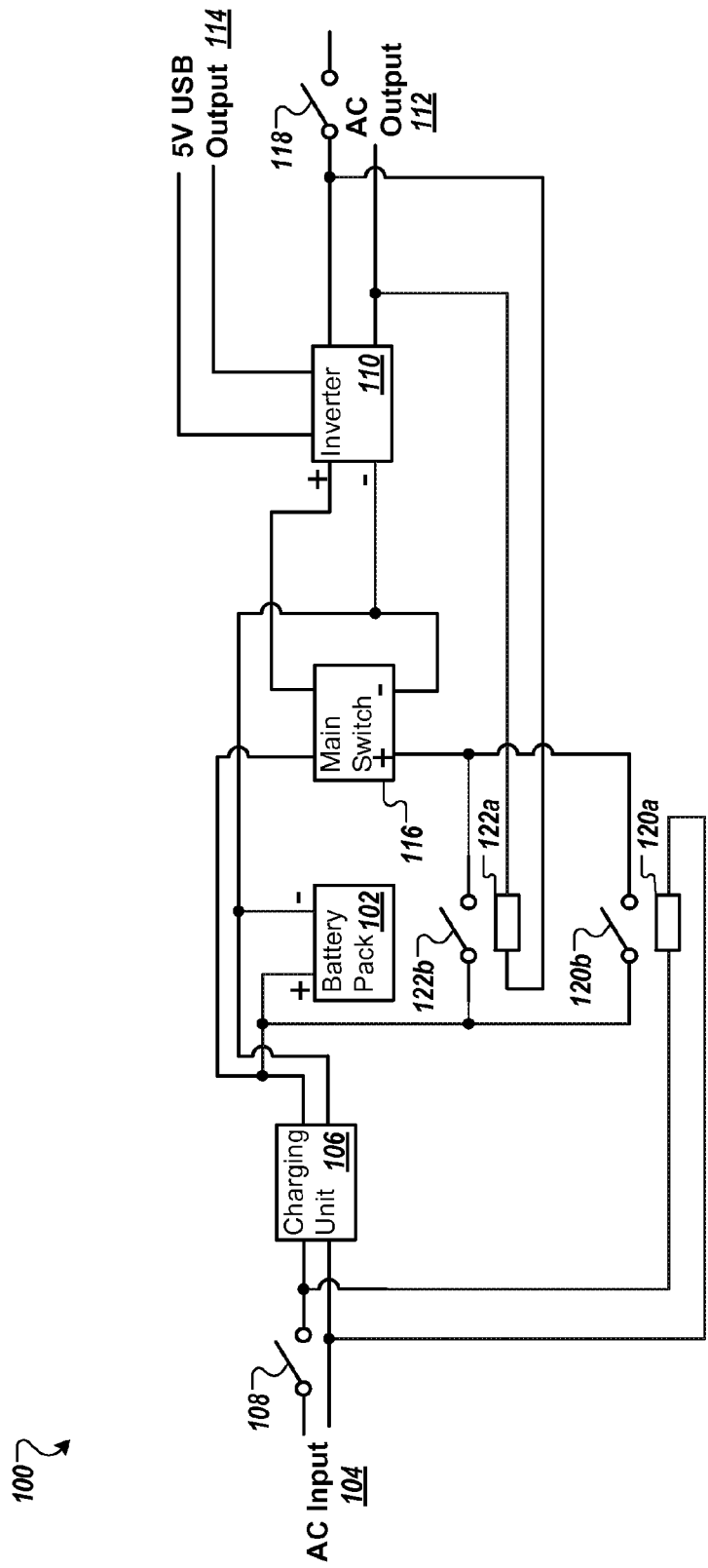
FIG. 1 is a schematic diagram of an example battery unit configuration for a portable power supply.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

In some implementations, a portable power supply may include a lithium-ion battery pack, and an alternating current (A/C) input for charging the lithium-ion battery pack, for example by connecting the A/C input to a household wall socket. The portable power supply may further include an A/C output in communication with an A/C socket connector.

In some implementations, a device such as a small household appliance, electronic device, or power tool may be plugged into the A/C socket connector to supply power to the device. In some examples, the device may include a television, laptop computing device, electric cook top, miniature refrigerator, blender, electric light, or stereo system. In some implementations, the portable power supply may include two or more A/C socket connectors, for example to temporarily supply power to a number of items such as both a household computer and a computer monitor. In other examples, the portable power supply may be used to provide power to both a television and a blender during a tailgate party, or to a sound system and display unit for an information booth at an outdoor fair or festival.

In some implementations, the portable power supply may further include one or more universal serial bus (USB) output connectors. For example, one or more USB ports may be available to attach a USB cord between the portable power supply and a USB-powered device such as a smart phone, personal digital assistant (PDA), tablet computer, or portable digital media player.

In some implementations, the portable power supply may further include a direct current output port. For example, the portable power supply may be configured for use as a jump starter to jump start a car battery using a 12 Volt D/C output.

In some implementations, the portable power supply may be configured to provide power to one or more devices, such as a television, for more than ten hours. In some implementations, the portable power supply may include a forty, sixty, or one hundred amp output. In some implementations, the portable power supply may be capable of providing approximately five hundred Watts per hour. The portable power supply, in some implementations, may weigh approximately twenty to seventy pounds. For example, based upon 100 Amp-hour lithium-ion battery cells arranged in a 12 Volt D/C configuration, the portable power supply may weigh approximately twenty-five to forty pounds.

In some implementations, the portable power supply may be designed to protect the lithium-ion battery pack from damage due to overcharging and/or over-discharging. For example, a battery charging unit may be designed to shut off automatically when a voltage of the lithium-ion battery pack reaches an approximate upper threshold level. In another example, an inverter unit may be designed to shut off automatically when a voltage of the lithium-ion battery pack reaches an approximate lower threshold level. In some implementations, the portable power supply may include circuitry for isolating the lithium-ion battery pack from an inverter unit while the portable power supply is not in use to remove a potential parasitic load due to the inverter.

FIG. 1 illustrates a schematic diagram 100 of an example battery unit configuration for a portable power supply. The portable power supply, in some implementations, may include a lithium-ion battery pack 102 connected to a charging unit 106. In some implementations, the lithium-ion battery pack 102 may include a 12 Volt direct current (D/C) lithium-ion battery. In other implementations, the lithium-ion battery pack 102 may include a number of smaller battery units connected together to equal a 12 V D/C battery. For example, the lithium-ion battery pack 102 may contain four 3.3 V lithium-ion battery cells in serial connection.

The charging unit 106, in some implementations, may accept an A/C voltage input 104, such as an 110V or 220V input provided through a connection to a wall socket. A switch 108, in some implementations, may be activated (e.g., caused to move to a closed position) to connect the A/C voltage input 104 to the charging unit 106. In some implementations, the charging unit 106 may output a 12V D/C power supply for charging the lithium-ion battery pack 102. The charging unit 106, in some implementations, may be programmed for automatic shut-off upon detecting that the voltage of the lithium-ion battery pack 102 has reached a threshold voltage. For example, the charging unit 106 may shut off upon determining that the voltage of the lithium-ion battery pack 102 has reached approximately 14.4 Volts D/C.

To provide power to one or more devices, in some implementations, the portable power supply may include an inverter 110 connected to one or more output power supplies, such as an A/C output 112 and a 5V D/C output 114. The A/C output 112, in some implementations, may be connected to one or more input plugs such as two- or three-pronged power sockets, for providing an 110V or 220V A/C power supply to one or more devices. In some implementations, an output switch 118 may be activated (e.g., closed) to connect the output of the inverter 110 to the A/C output 112 (e.g., one or more outlets, plug connections, or cords configured to supply A/C power to one or more devices). The output switch 118, in some implementations, may be triggered manually, for example using a switch button (e.g., two way "on/off" or three-way switch) on the exterior of the power supply. In some implementations, the output switch 118 may be triggered automatically, for example upon detecting a device plugged into the portable power supply. In some implementations, the 5V D/C output 114 may be connected to one or more USB ports to supply power to one or more USB-tethered devices. In Some implementations, the 5V D/C output 114 may be connected to the inverter 110 via the output switch 118 or a separate output switch (not illustrated). Additionally, in some implementations, a 12V D/C output (not illustrated) may be provided, for example to allow the option of jump-starting a car battery using the portable power supply.

In some implementations, the inverter 110 may be designed to automatically shut off upon detecting that the charge of the lithium-ion battery pack 102 has fallen to a threshold voltage level. For example, the inverter 110 may be designed to shut off upon detecting that the lithium-ion battery pack 102 is at or below a charge level of approximately 11.2 Volts. In some implementations, shutting off the inverter 110 upon detection of a threshold voltage level may protect the lithium-ion battery pack 102 from over-discharging.

To further protect the lithium-ion battery pack 102 of the portable power supply from over-discharging, in some implementations, a main switching unit 116 may be provided between the lithium-ion battery pack 102 and the inverter 110. For example, the inverter 110 may continue to drain the lithium-ion battery pack 102 through a parasitic load, even in times of shut-off. To avoid the drain on the lithium-ion battery pack 102 due to this parasitic load, in some implementations, the main switching unit 116 may be configured to electrically isolate the lithium-ion battery pack 102 from the inverter 110. In some implementations, the main switching unit 116 may be a solid state relay (SSR). The main switching unit 116, in some implementations, may be controlled by both an input relay 120 (e.g., solenoid 120a and switch 120b) and an output relay 122 (e.g., solenoid 122a and switch 122b). The switch 120b of the input relay 120, for example, may be configured to close when the corresponding solenoid 120a receives an approximate A/C voltage input (e.g., 110V, 220V, etc.). For example, the solenoid 120a may detect the A/C voltage input 104. When the input relay 120 is in the active, or closed, position (e.g., upon receiving an input voltage to the charging unit 106), the main switching unit 116 may be activated, placing the lithium-ion battery pack 102 in electrical communication with the inverter 110. If, instead, the charging unit 106 is not being supplied with power, the inverter 110 may be placed in electrical communication with the lithium-ion battery pack 102, in some implementations, if the output switch 118 is in a closed position. For example, if the solenoid 122a of the output relay 122 detects an approximate A/C voltage output (e.g., 110 V, 220 V, etc.) at the A/C output 112, the solenoid 122a may cause the output relay switch 122b to move to the closed position. In this manner, the inverter 110 may be in electrical communication with the lithium-ion battery pack 102 only when the portable power supply is in either a charging mode or a discharging mode. If, instead, the portable power supply is in a powered down mode (e.g., offline, unplugged, or otherwise not in use), the main switching unit 116 may effectively isolate the lithium-ion battery pack 102 from the inverter 110.

Figure 2A:
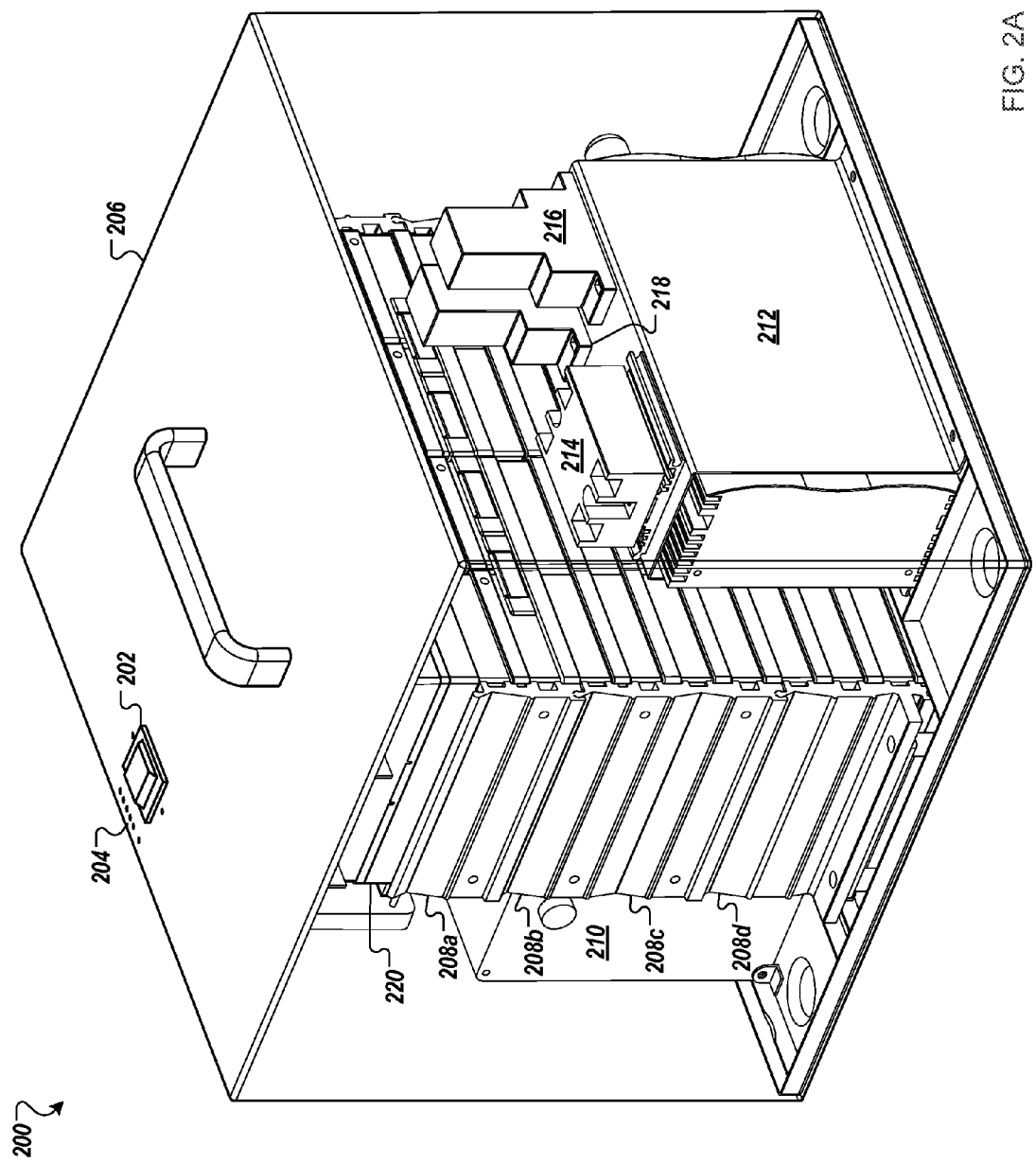
FIGS. 2A and 2B provide views of an example portable power supply.
Figure 2B:
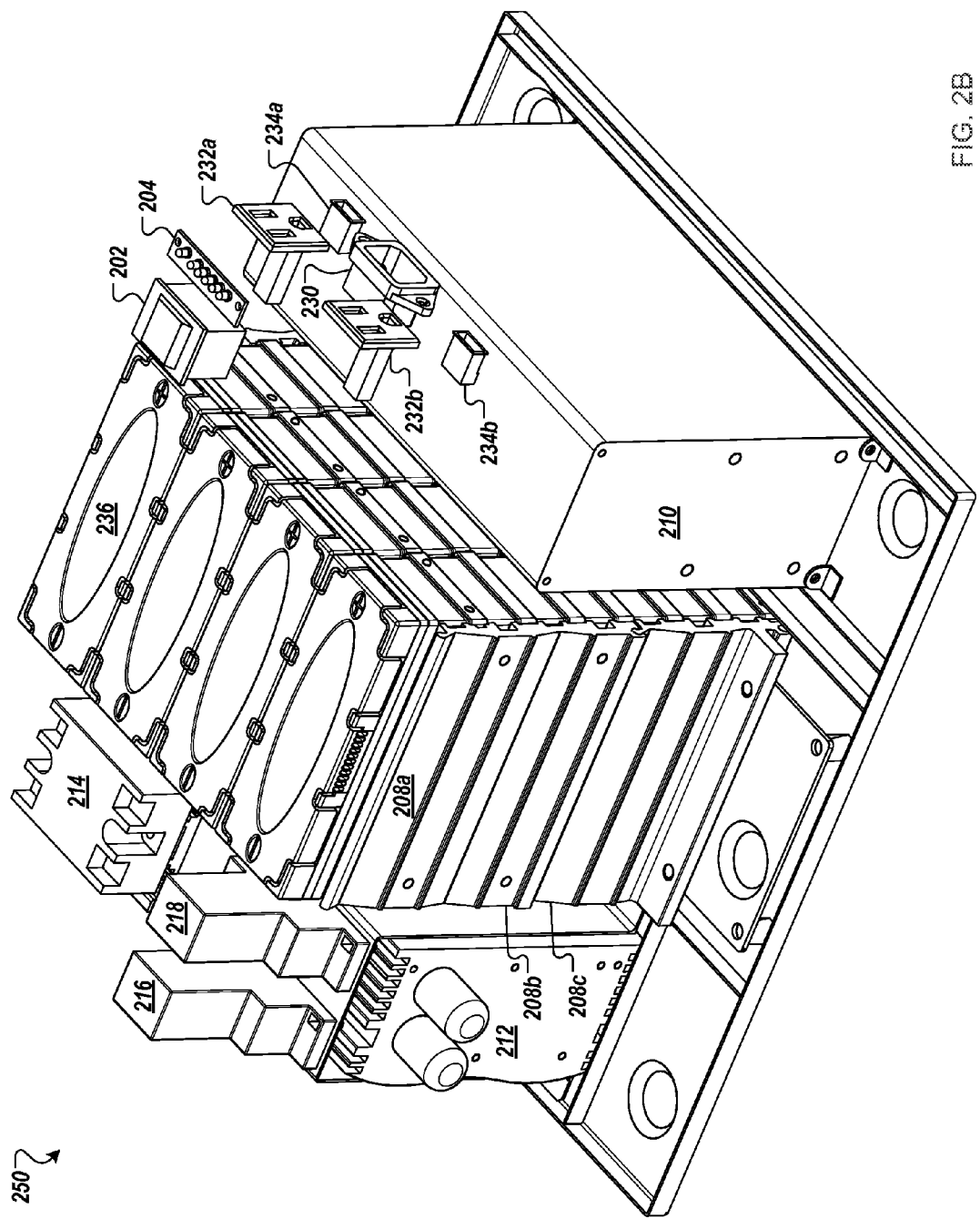

In some implementations, a three-way switch on the portable power supply may be used to select the current input state (e.g., charging, discharging, or offline). Turning to FIGS. 2A and 2B, example portable power supplies 200 and 250, in some implementations, may include a three-way switch 202 to select an operational mode of the portable power supply 200, 250. In some implementations, a visual indicator may provide a user an indication of the current operational state of the portable power supply 200. For example, a series of light emitting diodes (LEDs) 204 may include one or more power indicators (e.g., a green LED indicating "on," or a red LED indicating "off"). In some implementations, the series of LEDs 204 may further include a series of LEDs configured to indicate a relative charge level of a battery unit of the portable power supply 200. For example, as illustrated in FIG. 2B, a first LED 204 may indicate on/off (e.g., lit/unlit), while the remaining five LEDs 204 may indicate an approximate percentage charge level of the battery unit (e.g., one light for twenty percent full, two lights for forty percent full, etc.).

Returning to FIG. 2A, within an exterior enclosure 206, the portable power supply 200, in some implementations, may include a series of rechargeable battery cells 208, such as lithium-ion battery cells. In a particular example, the rechargeable battery cells 208 may be 3.3 Volt rechargeable lithium-ion battery cells connected in series to achieve a 12 Volt battery unit. In some implementations, a balancing unit 220 may be provided for equalizing the charge levels of the lithium-ion battery cells. The balancing unit 220, for example, may be positioned beneath a battery unit cap 236, as illustrated in FIG. 2B. An example implementation of a balancing unit is described in relation to U.S. patent application Ser. No. 12/939,889 entitled "Battery Unit Balancing System" and filed Nov. 4, 2010, now published as U.S. Patent Publication Number 2011/0074355, the contents of which is herein incorporated in its entirety.

A balancing unit, in some implementations, may be connected to each rechargeable battery cell 208. For example, as illustrated in FIG. 2A, each of the four rechargeable battery cells 208a, 208b, 208c, and 208d may include a correlating balancing unit including a discharging circuit. The discharging circuit, in some implementations, may be configured for automatic activation. For example, upon detection of the voltage of one of the battery cells 208 exceeding a predetermined threshold, the discharging circuit may draw a constant discharging current from the particular battery cell 208 until the voltage of the particular battery cell 208 falls below the predetermined threshold. In some implementations, the predetermined threshold may be set to approximately 3.60 Volts.

In some implementations, the discharging circuit may include a voltage dividing circuit, a comparator circuit, and one or more current source circuits. The voltage dividing circuit may be connected to the comparator circuit that is activated to conduct when the voltage of a particular battery cell 208 exceeds the predetermined threshold. The voltage dividing circuit, in some implementations, may be configured to generate a predetermined voltage that activates the one or more current source circuits via the comparator circuit. The discharging current of the discharging circuit, in some implementations, may be configured to discharge at approximately 0.5% of the ampere-hour rate of the particular rechargeable battery cell 208. The discharging current, in some examples, may be selected from 0.22 A, 0.33 A, 0.5 A, 0.89 A or 1.11 A.

Although illustrated in FIG. 2A as a series of four rechargeable battery cells 208a, 208b, 208c, and 208d, in other implementations more or fewer rechargeable battery cells 208 may be included in the portable power supply 200. For example, the portable power supply 250, described in relation to FIG. 2B, may include three rechargeable battery cells 208a, 208b, and 208c. The number of rechargeable battery cells 208, in some implementations, may be increased or decreased to adjust an available total power supply, for example as described in Watt-hours capacity. In some examples, the battery capacity of the rechargeable battery cells 208 may be 480 Watt-hours (Wh), 720 Wh, and 1.2 kiloWatt-hours (kWh). The battery capacity, in some implementations, may be indicative of an ampere-hour (Ah) charge transfer ability of each cell. For example, a 480 Wh capacity may correlate to 40 Ah battery cells, while a 720 Wh capacity may correlate to 60 Ah battery cells, and a 1.2 kWh capacity may correlate to 100 Ah battery cells.

In some implementations, a charging unit 210 may provide a mechanism for recharging the rechargeable battery cells 208, for example through an exterior electrical connection. Turning to FIG. 2B, an A/C wall cord port 230 may be provided for connecting the portable power supply 250 to an electrical source. In some implementations, upon plugging in the portable power supply 250, the portable power supply 250 may recognize the availability of charging electricity and automatically engage the charging unit 210. In some implementations, while the portable power supply 250 is connected to a power source, the charging unit 210 may supply a trickle charge or float charge feature. For example, the charging unit 210 may detect that a current level of charge in the rechargeable battery cells 208 has dropped to a threshold level and initiate charging the rechargeable battery cells 208. In some implementations, the charging unit 210 may charge the rechargeable battery cells 208 to an upper voltage threshold (e.g., approximately 14.4 Volts), then automatically end the charging cycle to protect the rechargeable battery cells 208 from becoming over-charged.

An inverter 212, in some implementations, may be provided for converting the power stored by the rechargeable battery cells 208 to an appropriate output (e.g., 110 V A/C, 220 V A/C, 5V D/C, etc.). The inverter 212, for example, may supply one or more output ports, such as, in some examples, a two- or three-prong A/C supply port, a USB port, and a vehicle jumper cable connection. As illustrated in relation to FIG. 2B, in a particular example, the portable power supply 250 may include a set of three-prong A/C supply ports 232a, 232b and a set of five Volt USB ports 234a, 234b.

In some implementations, the inverter 212 may be selectively placed in electrical communication with the rechargeable battery cells 208 through a main switching unit 214. The main switching unit 214, for example, may include a solid state relay. The main switching unit 214, in some implementations, may be controlled by an output voltage-triggered switching unit 216 (e.g., an output relay such as the output relay 122 described in relation to FIG. 1) and/or an input voltage-triggered switching unit 218 (e.g., an input relay such as the input relay 120 as described in relation to FIG. 1). Turning to FIG. 2B, for example, the output-voltage triggered switching unit 216 may activate the main switching unit 214 upon detecting an output voltage. The output voltage, for example, may be detected from an A/C output supplied from the inverter 212 to at least one of the A/C supply ports 232a, 232b. In another example, the output voltage may be detected from a D/C output supplied from the inverter 212, such as a 5 V D/C output supplied to at least one of the five Volt USB ports 234a, 234b or a 12 Volt supply provided to a vehicle jumper cable connection (not illustrated). The input-voltage triggered switching unit 218 may activate the main switching unit 214 upon detecting an input voltage. The input voltage, for example, may be detected from an A/C input supplied to the charging unit 210, such as 110 V or 220 V A/C input connected to the A/C wall cord port 230. If neither the input-voltage triggered switching unit 218 nor the output voltage-triggered switching unit 216 is triggered, the main switching unit 218 may be deactivated, thus isolating the battery unit 208 from the inverter 212. In this manner, the battery unit 208 may be protected from over-discharging via a parasitic load from the inverter 212, for example in the circumstance where the portable power supply 250 is left activated (e.g., when the three-way switch 202 is in a discharge or charge position rather than in an off position).

In view of the structure, functions and apparatus of the systems and methods described here, in some implementations, an apparatus and method of use for a portable power supply are provided. Having described certain implementations of methods and apparatus for supporting analysis of genetic sequence data, it will now become apparent to one of skill in the art that other implementations incorporating the concepts of the disclosure may be used. Therefore, the disclosure should not be limited to certain implementations, but rather should be limited only by the spirit and scope of the following claims.

What is claimed is:

1. An apparatus comprising:
   a battery unit comprising one or more lithium-ion battery cells;
   a charging unit configured with a first automatic shut-off, wherein the automatic shutoff is responsive to detection of an upper threshold voltage level of the battery unit;
   an inverter configured with a second automatic shut-off, wherein the second automatic shut-off is responsive to detection of a lower threshold voltage level of the battery unit; and
   an input connection functionally connected to the charging unit;
      wherein the apparatus is configured to isolate the battery unit from the inverter responsive to detecting both:
         the input connection is disconnected from an input voltage source; and
         the inverter is shut off;
   a batty balancing system comprising;
      a discharging circuit configured for connection to said battery unit comprising;
         a voltage dividing circuit:
            a comparator circuit comprising:
               a shunt regulator configured in parallel with said voltage divider;
               one or more current source circuits comprising:
                  a current regulator; and
                  an output device;
               wherein said output device, said shunt regulator and said one or more current source circuits are connected in parallel with the battery unit, wherein, while connected to the battery unit, the discharging circuit is configured for automatic activation such that, when a voltage of the battery unit exceeds a predetermined threshold, the discharging circuit draws a constant discharging current from the battery unit until the voltage of the battery unit falls below the predetermined threshold;
   wherein the voltage dividing circuit is connected to the comparator circuit, via a node to the shunt regulator,
   said shunt regulator is connected to said current source circuit via a current limiting resistor of said output device,
   whereby the comparator circuit is activated to conduct when the voltage of the battery unit exceeds the predetermined threshold, the voltage dividing circuit is programmed to generate a predetermined voltage,
   wherein the predetermined voltage activates the one or more current source circuits via the comparator circuit, and
   whereby each current source circuit of the one or more current source circuits is configured such that a substantially stable current flows independent of the voltage of the battery unit.

2. The apparatus of claim 1, further comprising a first switching unit connected between the battery unit and a main switching unit, wherein
   detecting the inverter is shut off comprises failing to detect a threshold output voltage of the inverter at an output connection, and
   the first switching unit is configured to move to a closed position responsive to detecting the threshold output voltage.

3. The apparatus of claim 2, wherein the threshold output voltage is substantially equivalent to 110 Volts.

4. The apparatus of claim 2, further comprising a second switching unit connected between the battery unit and the main switching unit, wherein
   detecting the input connection is disconnected from an input voltage source comprises failing to detect a threshold input voltage at the input connection; and
   the second switching unit is configured to move to a second closed position upon detecting the threshold input voltage at the input connection.

5. The apparatus of claim 4, wherein the threshold input voltage is substantially equivalent to 110 Volts.

6. The apparatus of claim 1, further comprising a three-way switch, wherein
   the three-way switch comprises a charging position, a discharging position, and an off position; and
   the apparatus is configured to isolate the battery unit from the inverter when the three way switch is in the off position.

7. The apparatus of claim 1, further comprising a plurality of light emitting diodes presented in series, wherein a relative number of activated light emitting diodes of the plurality of light emitting diodes correlates to an approximate percentage of charge of the battery unit.

8. The apparatus of claim 1, wherein a capacity of the battery unit is at least 400 Watt hours.

9. The apparatus of claim 1, wherein the battery unit comprises at least four lithium-ion battery cells.

10. The apparatus of claim 1, wherein the battery unit comprises a potential of approximately twelve Volts.

11. The apparatus of claim 1, wherein the input connection comprises an A/C plug interface for providing a wired connection to a household electrical output socket.

12. The apparatus of claim 1, further comprising at least one A/C output socket connection functionally connected to the inverter.

13. The apparatus of claim 12, further comprising at least one USB output connection functionally connected to the inverter.

14. The apparatus of claim 1, further comprising a balancing system connected to the battery unit, wherein the balancing system comprises a discharging circuit configured to, responsive to detecting a battery cell voltage of a predetermined voltage threshold, draw a constant discharging current from at least a first battery cell of the one or more lithium-ion battery cells.

15. The apparatus of claim 14, wherein the balancing system draws the constant discharging current until detecting the battery cell voltage is below the predetermined voltage threshold.

16. A system, comprising:
a rechargeable battery unit comprising one or more lithium-ion battery cells;
a charging unit;
an inverter functionally connected to an output connection;
an input connection functionally connected to the charging unit, wherein the input connection is configured for connection to a recharging power source;
a main switching unit;
a first switching unit connected between the battery unit and the main switching unit,
wherein the first switching unit is configured to activate the main switching unit responsive to detecting a threshold output voltage of the inverter at an output connection;
a second switching unit connected between the battery unit and the main switching unit,
wherein the second switching unit is configured to activate the main switching unit responsive to detecting a threshold input voltage at the input connection;
wherein the first switching unit and the second switching unit are configured to prevent over-discharging the rechargeable battery unit by isolating the battery unit from a parasitic load of the inverter; and
a battery unit balancing system comprising:
a discharging circuit configured for connection to said battery unit comprising:
a voltage dividing circuit;
a comparator circuit comprising:
a shunt regulator configured in parallel with said voltage divider;
one or more current source circuits comprising:
a current regulator; and
an output device,
wherein said output device, said shunt regulator and said one or more current source circuits are connected in parallel with the battery unit, wherein, while connected to the battery unit, the discharging circuit is configured for automatic activation such that, when a voltage of the battery unit exceeds a predetermined threshold, the discharging circuit draws a constant discharging current from the battery unit until the voltage of the battery unit falls below the predetermined threshold,
wherein the voltage dividing circuit is connected to the comparator circuit, via a node to the shunt regulator,
said shunt regulator is connected to said current source circuit via a current limiting resistor of said output device,
whereby the comparator circuit is activated to conduct when the voltage of the battery unit exceeds the predetermined threshold, the voltage dividing circuit is programmed to generate a predetermined voltage,
wherein the predetermined voltage activates the one or more current source circuits via the comparator circuit, and
whereby each current source circuit of the one or more current source circuits is configured such that a substantially stable current flows independent of the voltage of the battery unit.

17. The system of claim 16, wherein the output connection is configured for connection to at least one of a universal serial bus port and an A/C socket outlet.

18. The system of claim 16, wherein at least one of the first switching unit and the second switching unit comprises a solenoid.

19. The system of claim 16, wherein the charging unit is configured with an automatic shut-off, wherein the automatic shut-off is responsive to detection of an upper threshold voltage level of the battery unit.

20. The system of claim 16, wherein the inverter is configured with an automatic shut-off, wherein the automatic shut-off is responsive to detection of a lower threshold voltage level of the battery unit.

* * * * *